United States Patent [19]
Wood

[11] Patent Number: 5,612,597
[45] Date of Patent: Mar. 18, 1997

[54] OSCILLATING DRIVER CIRCUIT WITH POWER FACTOR CORRECTION, ELECTRONIC LAMP BALLAST EMPLOYING SAME AND DRIVER METHOD

[75] Inventor: Peter Wood, Rolling Hills Est., Calif.

[73] Assignee: International Rectifier Corporation, El Segundo, Calif.

[21] Appl. No.: 365,831

[22] Filed: Dec. 29, 1994

[51] Int. Cl.$^6$ ........................................................ G05F 1/00
[52] U.S. Cl. ........................... 315/293; 315/291; 315/307; 315/224; 315/209 R; 315/DIG. 4; 315/DIG. 7
[58] Field of Search .............................. 315/209 R, 223, 315/224, 226, 251, 245, 247, 265, 272, 275, 276, 282, 287, 289, 293, 307, 308, 311, 352, DIG. 4, DIG. 5, DIG. 7

[56] References Cited

U.S. PATENT DOCUMENTS

| | | | |
|---|---|---|---|
| 4,866,347 | 9/1989 | Nuckolls et al. | 315/DIG. 7 X |
| 4,873,471 | 10/1989 | Dean et al. | 315/308 |
| 5,001,400 | 3/1991 | Nilssen | 315/209 R |
| 5,258,692 | 11/1993 | Jones | 315/247 |
| 5,331,253 | 7/1994 | Counts | 315/209 R |
| 5,357,174 | 10/1994 | Nerone et al. | 315/224 |
| 5,363,020 | 11/1994 | Chen et al. | 315/209 R |
| 5,367,228 | 11/1994 | Kachmarik et al. | 315/307 |
| 5,387,847 | 2/1995 | Wood | 315/209 R |
| 5,394,064 | 2/1995 | Ranganath et al. | 315/209 R |
| 5,404,082 | 4/1995 | Hernandez et al. | 315/219 |
| 5,424,611 | 6/1995 | Moriarty, Jr. | 315/307 X |

OTHER PUBLICATIONS

Peter N. Wood, "Next Generation Electronic Ballasts Using the New Cost Saving IR2155 MGD, AN–995", Oct. 14, 1993, pp. 13–15.

*Primary Examiner*—Robert Pascal
*Assistant Examiner*—Haissa Philogene
*Attorney, Agent, or Firm*—Ostrolenk, Faber, Gerb & Soffen, LLP

[57] ABSTRACT

A circuit and method for driving a load such as a gas discharge illumination device from an ac main supply with a high power factor. The circuit includes a pair of electronic switches arranged in a half bridge configuration and a self oscillating driver circuit having two outputs for driving respective ones of the electronic switches, the electronic switches being coupled across a dc bus voltage and having a switched output coupled to the load. The circuit further includes a voltage regulator circuit coupled across the dc bus voltage and coupled to the self oscillating driver circuit, the voltage regulator circuit maintaining the dc bus voltage within a preset range and preventing the dc bus voltage from exceeding the range if the load is removed or becomes an open circuit. The voltage regulator preferably is a boost regulator switching an inductance. The circuit is particularly suitable for driving gas discharge illumination devices, e.g., fluorescent lamps, at a high power factor with minimum instability of the dc bus.

72 Claims, 9 Drawing Sheets

5,612,597

OSCILLATING DRIVER CIRCUIT WITH POWER FACTOR CORRECTION, ELECTRONIC LAMP BALLAST EMPLOYING SAME AND DRIVER METHOD

BACKGROUND OF THE INVENTION

The present invention relates to an oscillating driver circuit with power factor correction, suitable, for instance, for driving a load at a near unity power factor. For example, the present invention is particularly suited for use as an electronic ballast for driving fluorescent lamps or other gas discharge illumination devices.

Electronic ballast circuits have recently undergone a revolution in sophistication from the early bipolar designs of ten years ago. This has been brought about partly by the advent of power MOSFET switches which have inherent advantages in efficiency and also by incentives and utility rebate programs sponsored by domestic and foreign governments. New I.E.C. requirements have also spurred the design of high power factor ballasts and are starting to impose further restrictions on harmonic content of current waveforms for equipment operated from AC mains.

Before the burgeoning interest in these new ballast designs made possible by the power semiconductor industry, coil and core electromagnetic fluorescent ballasts were manufactured in large quantities by a few key suppliers.

Today, there are many electronic companies that are "in the ballast business" producing electronic ballasts.

Most electronic ballasts use two power switches in a totem pole (half-bridge) arrangement functioning as an inverter which derives power from a dc bus. The dc bus voltage is provided by a rectifier operating from the ac mains supply. The illumination tube circuits consist of L-C series resonant circuits with the lamp(s) connected across one of the reactances. FIG. 1 shows a basic prior art electronic ballast.

In the circuit of FIG. 1, the electronic switches 10 and 20 are power MOSFETs driven to conduct alternately by windings on a current transformer 12. The primary 12A of transformer 12 is driven by the oscillating current in the lamp circuit 14 and operates at the resonant frequency of inductor L and the capacitor C at the input of the transformer winding 12A. Capacitor 18 is a coupling capacitor coupling the lamp circuit 14 to the electronic ballast and typically has a much higher capacitance value than capacitor C. Capacitor 18 determines the resonant frequency once the lamp 14 strikes, because the lamp voltage will effectively short capacitor C once the lamp lights.

Without a trigger device, the inverter circuit of FIG. 1 is not self starting. Accordingly, it must be pulsed by a DIAC 16 or other trigger device connected to the gate of the lower MOSFET 20. The trigger device 16 is triggered by charge on a capacitor 19 in series with resistor 21 coupled to dc bus D.

After the initial turn-on of the lower switch 20, oscillation is sustained and a high frequency square wave (30–80 kHz) excites the L-C resonant lamp circuit 14. The sinusoidal voltage across capacitor C is magnified by the Q at resonance and develops sufficient amplitude to strike the lamp 14A, which then provides flicker-free illumination. The frequency of oscillation is thereafter determined by inductor L and capacitor 18.

This basic circuit has been the standard for electronic ballasts for a number of years but has the following inherent shortcomings:

1) It is not self starting without a triggering device;
2) It has poor switch times;
3) It is labor intensive to manufacture because of the torroidal current transformer 12;
4) It is not amenable to dimming; and
5) It is expensive to manufacture in large quantities because of the current transformer.

Another recent development has been the introduction of integrated circuit chips for driving power MOSFETS and IGBTs in inverter circuits such as used in electronic ballasts. These integrated circuit chips, known as MOS Gate Drivers (MGDs), offer significant cost, weight and space savings over driver circuits employing current transformers.

An example of an MGD is the IR2155 device available form International Rectifier Corporation. This device provides a self oscillating function which has been found to be particularly suited for use in inverter circuits, e.g., electronic lamp ballast circuits.

SUMMARY OF THE INVENTION

It is an object of the present invention to provide a driver circuit for driving a load and which employs an MGD device.

It is furthermore an object of the present invention to provide an inexpensive electronic ballast for a gas discharge illumination device and, more particularly, such an electronic ballast employing an MGD device.

It is furthermore an object of the present invention to provide a driver circuit for a load and which operates from an ac main supply at a high power factor approaching unity.

It is yet still a further object of the present invention to provide an electronic lamp ballast that operates at a high power factor.

It is a further object of the present invention to provide a driver circuit for a load which utilizes a self oscillating driver chip.

It is yet still a further object of the invention to provide a driver circuit for a load having a power factor correction circuit.

It is furthermore an object of the present invention to provide an oscillating driver chip with a power factor correction circuit.

It is yet a further object of the present invention to provide an electronic ballast for a gas discharge device, for example, a fluorescent lamp, having power factor correction.

The above and other objects of the present invention are achieved by a circuit for driving a gas discharge illumination device comprising a pair of electronic switches arranged in a half bridge configuration, a self oscillating driver circuit having two outputs for driving respective ones of the electronic switches, the electronic switches being coupled across a dc bus voltage and having a switched output coupled to the illumination device, and a voltage regulator circuit coupled across the dc bus voltage and coupled to the self oscillating driver circuit, the voltage regulator circuit maintaining the dc bus voltage within a preset range and preventing the dc bus voltage from exceeding the range if the illumination device is removed or becomes substantially an open circuit. Preferably, the voltage regulator circuit comprises a boost regulator switching an inductor supplying current to the dc bus.

The objects of the invention are furthermore achieved by a circuit for driving a load from an ac mains supply at a high power factor approaching unity, comprising a pair of electronic switches arranged in a half bridge configuration, a self oscillating driver circuit having two outputs for driving respective ones of the electronic switches, the electronic switches being coupled across a dc bus voltage supplied by a rectifier from the ac mains supply and the electronic switches having a switched output coupled to the load and a voltage regulator circuit being coupled across the dc bus voltage and being coupled to the self oscillating driver circuit, the voltage regulator circuit maintaining the dc bus voltage within a preset range and preventing the dc bus voltage from exceeding the range if the load is removed or becomes an open circuit. Preferably, the regulator circuit comprises a boost regulator switching an inductor supplying current to the dc bus.

Other objects, features and advantages of the invention will be apparent from the detailed description below.

BRIEF DESCRIPTION OF THE DRAWINGS

The invention will now be described in greater detail in the following detailed description with reference to the drawings in which.

DETAILED DESCRIPTION

Figure 2:
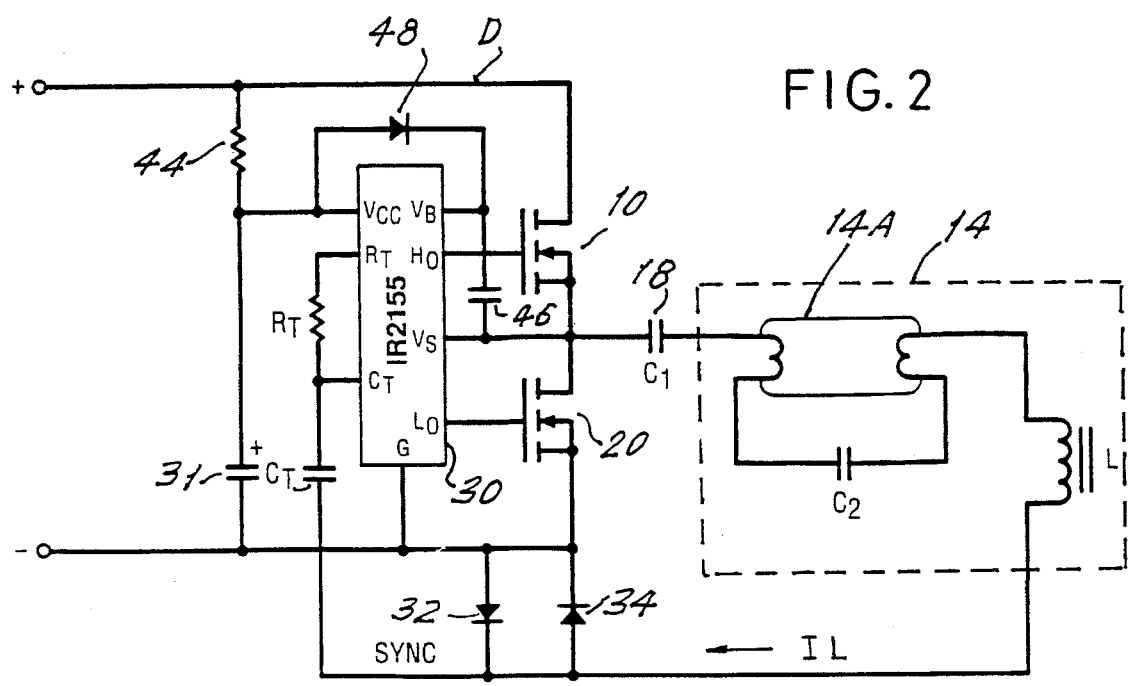
FIG. 2 shows an illustrative electronic ballast circuit using a MOS gate driver chip.

With reference again to the drawings, the basic circuit of FIG. 2 employs a cost-saving MOS gate driver (MGD), e.g., the International Rectifier IR2155 MOS Gate Driver, in an electronic ballast circuit. Other MGDs could also be used.

MOS Gate Drivers (MGDs) are monolithic power integrated circuits capable of driving low-side and high-side MOSFETs or IGBTs from logic level, ground referenced inputs.

MGDs like the IR2155 provide offset voltage capabilities up to 600 volts dc and, unlike expensive driver transformers, can provide super-clean waveforms of any duty cycle from 0–99%.

Figure 1:
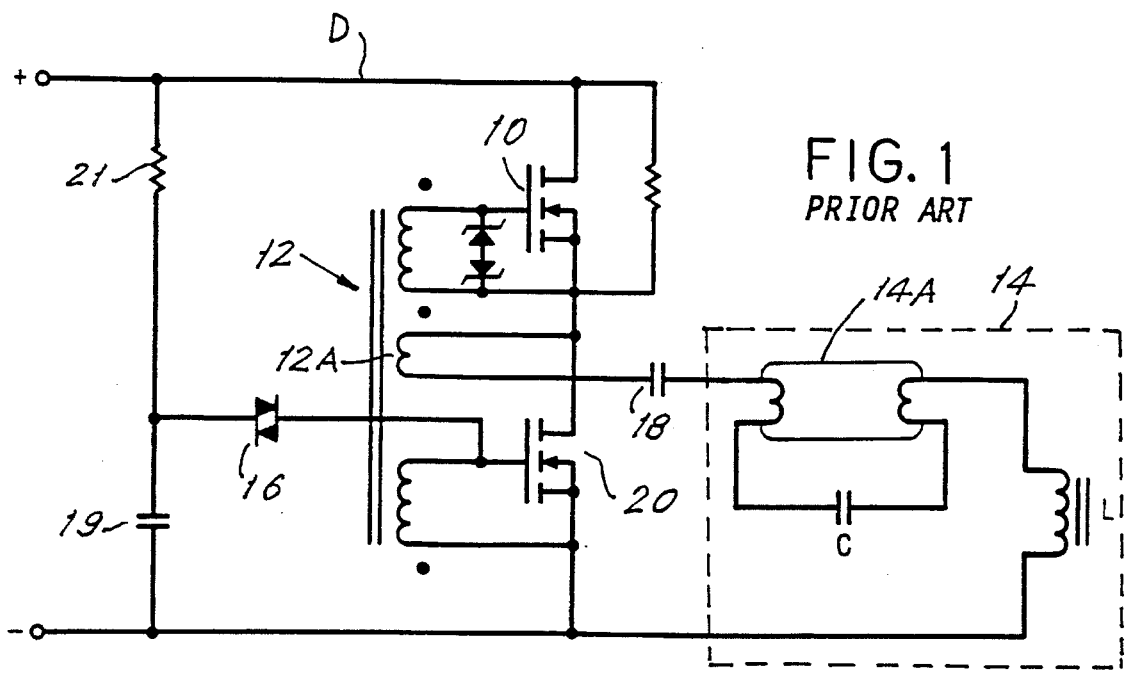
FIG. 1 shows a prior art electronic ballast circuit using a current transformer.

The IR2155 MGD shown in FIG. 2, in addition to solving the disadvantages of the circuit of FIG. 1, has an oscillating front end similar in function to the CMOS 555 timer IC. This allows the IR2155 MGD to have self oscillating or synchronized oscillation functions with the addition of external $R_T$ and $C_T$ components (see FIG. 2).

The IR2155 MGD also has internal circuitry which provides a nominal 1.2 μSec dead time between outputs and alternating high side and low side outputs for driving half-bridge power switches.

When used in the self oscillating mode, the frequency of oscillation of the MGD 30 shown in FIG. 2 is given by:

$$f_{osc} = \frac{1}{1.4 \times (R_T + 150\Omega)C_T} \quad (1)$$

The IR2155 MGD 30 shown in FIG. 2 is intended to be supplied from a rectified ac input voltage and for that reason, the device operates with minimum quiescent current and has a 15 volt internal shunt regulator so that only a dropping resistor 44 is used to provide voltage $V_{CC}$ from the higher voltage dc bus D. Alternatively, if the MGD employed does not have an internal regulator, a separate regulator would be necessary to provide voltage $V_{CC}$ from the dc bus D. Furthermore, as the IR2155 device is well known, the equivalent of the IR2155 device using discrete components, including those components necessary to accomplish the oscillation function, could also be employed, as known to those of skill in the art. The specification sheet for the IR2155 device is available from International Rectifier Corp.

Referring again to FIG. 2, the IR2155 driver 30 also has a synchronizing capability. The two back-to-back oppositely poled diodes 32 and 34 in series with the lamp circuit 14 function effectively as a zero crossing detector for the lamp current $I_L$.

Before the lamp 14A strikes, the resonant circuit consists of L, $C_1$ and $C_2$, all in series. $C_2$ has a lower capacitance value than $C_1$ so it operates at a higher voltage than $C_2$ and it is this voltage which strikes the lamp 14A.

After the lamp strikes, $C_2$ is effectively shorted by the lamp voltage drop and the resonance frequency of the resonant circuit then depends upon L and $C_1$.

This causes a shift to a lower resonant frequency during normal operation, synchronized by sensing the zero crossing of the ac lamp current and using the resultant voltage to control the IR2155 oscillator at the terminal $C_T$ of the device 30.

In addition to the low quiescent current described above for the gate driver 30, there are two other components of dc supply current:

1) Current due to charging the input capacitance of the power switches 10 and 20; and 2) Current due to charging and discharging the junction isolation capacitance of the gate driver 30.

Both components of current are charge related and therefore follow the formula:

$$Q=CV \quad (2)$$

It can be readily seen, therefore, that to charge and discharge the power switches 10 and 20 input capacitances, the required charge is a product of the gate drive voltage and the actual input capacitances. The input power required is directly proportional to the product of charge and frequency and voltage squared as determined by equation (3) below:

$$\text{Power} = \frac{QV^2}{2} \times f \qquad (3)$$

The above relationships point to the following:
1) The lowest operating frequency should be selected consistent with minimizing inductor size.
2) The smallest die size for the power switches 10 and 20 consistent with low conduction losses should be selected. (This reduces the charge requirements.)
3) dc bus voltage is usually specified but if there is a choice, the lowest voltage should be used.

Charge is not a function of switching speed. The charge transferred is the same for 10 nSec or 10 μSec switch times.

As shown in FIG. 2, the MGD 30 can be used to make an electronic ballast circuit for fluorescent fixtures. By far the most popular fluorescent fixture is the so called "Double 40" type which uses two standard four foot 40 watt tubes in a common reflector.

Figure 3:
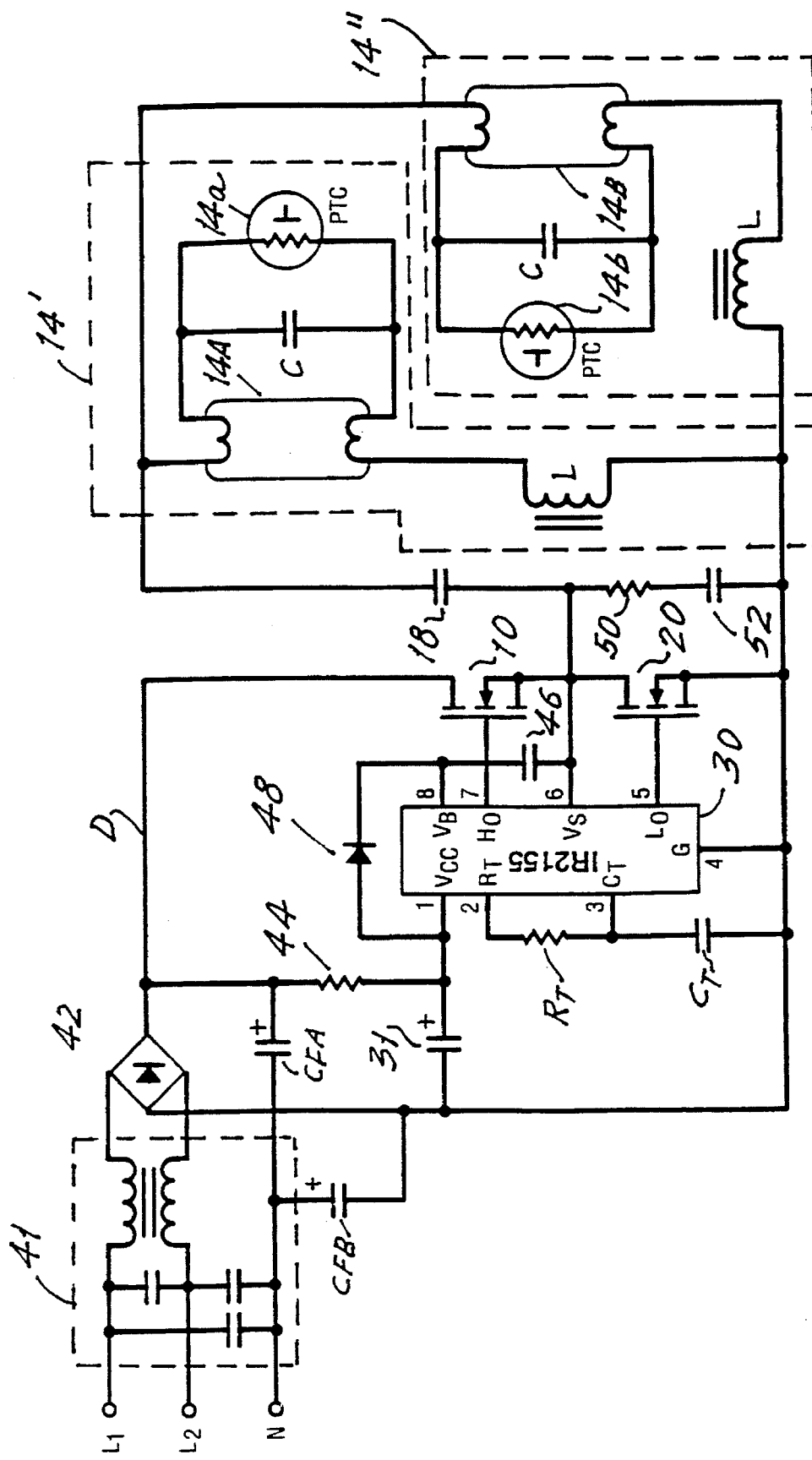
FIG. 3 shows an electronic ballast circuit of the type shown in FIG. 2 for a fluorescent lamp and having a low power factor.
Figure 4:
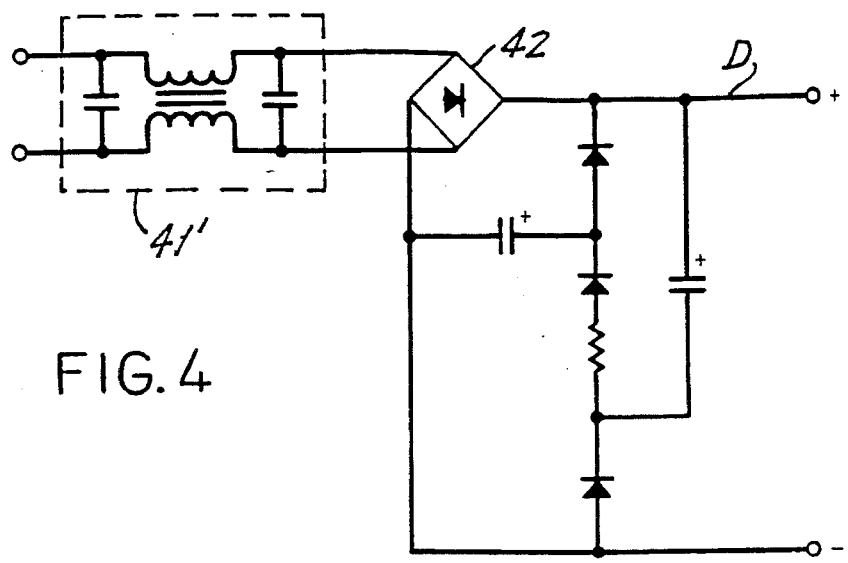
FIG. 4 shows a passive high power factor rectifier circuit as part of an electronic ballast but having an unacceptably high ripple voltage.

Two electronic ballast circuits are shown in FIGS. 3 and 4. FIG. 3 shows a low power factor circuit (approx. 0.6 lag) according to the basic design of FIG. 2 and employing an MGD. FIG. 4 is a passive circuit using a diode/capacitor configuration to achieve a power factor >0.95 and is discussed herein for explanatory purposes.

The low power factor circuit of FIG. 3 illustratively accepts 115 V ac or 230 V ac 50/60/400 Hz inputs to produce a nominal dc bus D voltage of 320 V dc. An input ac filter circuit 41 feeds a full wave rectifier bridge 42. Since the input rectifiers 42 conduct only near the peaks of the ac input voltage, the input power factor is approximately 0.6 lagging with a non-sinusoidal current waveform. This type of rectifier is not recommended for anything other than an evaluation circuit and indeed may become unacceptable as harmonic currents in power distribution systems are further reduced by power quality regulations.

The MOS Gate Driver 30 of FIG. 3 operates directly off the dc bus D through a dropping resistor 44 coupled to a filter capacitor 31 and oscillates in accordance with the following relationship:

$$f_{osc} = \frac{1}{1.4(R_T + 150\Omega)C_T}$$

For $R_T=15$ k ohms and $C_T=0.001$ uf, the frequency of oscillation is about 45 khz.

The dc bus D is filtered by electrolytic energy storage filter capacitors $C_{FA}$ and $C_{FB}$.

In the various drawing figures, like elements will be provided with like reference numerals. In the case of an element which has a similar but somewhat different or additional function, or wherein the element is somewhat changed or different in a later drawing figure, a prime (') designation will be employed herein.

Power for the high side switch 10 gate drive comes from a bootstrap capacitor 46 (as in FIG. 2) which is charged to approximately 14 volts ($V_{CC}=15$ volts) through diode 48 from Vcc whenever $V_S$ (pin 6) is pulled low during the low side power switch 20 conduction. The bootstrap diode 48 blocks the dc bus D voltage when the high side switch 10 conducts. A fast recovery diode (<100 nSec) is required for diode 48 to ensure that the bootstrap capacitor 46 is not partially discharged as the diode recovers and blocks the high voltage on bus D.

The high frequency output from the half-bridge comprising transistors 10 and 20 is a square wave with very fast transition times (approximately 50 nSec). In order to avoid excessive radiated noise from the fast wave fronts, a snubber comprising resistor 50 and capacitor 52 is used to slow down the switch times, illustratively, to approximately 0.5 μSec. There is a built in dead time of 1.2 μSec in the IR2155 MGD chip 30 to prevent shoot-through currents in the half-bridge formed by transistors 10 and 20.

The two fluorescent lamps 14A and 14B are operated in parallel, each part of a respective L-C resonant circuit 14' and 14". Up to four tube circuits can be driven from a single pair of MOSFETs sized to suit the power level.

The reactance values L and C for the lamp circuits 14' and 14" can be selected from L-C resonance tables or from the following equation for series resonance:

$$f = \frac{1}{2\pi \sqrt{LC}} \qquad (4)$$

The Q of the lamp circuits 14' and 14" is fairly low because of the need for operation at a fixed frequency which can vary because of the tolerances of the timing components $R_T$ and $C_T$. Fluorescent lamps do not normally require very high striking voltages so a Q of two or three is sufficient. "Flat" Q curves tend to result from larger inductors and small capacitor ratios where:

$$Q = \frac{2\pi f L}{R} \qquad (5)$$

R tends to be larger as more turns are used for the inductors L.

Soft-starting with tube filament pre-heating can be incorporated by using positive temperature coefficient (P.T.C). thermistors 14a and 14b across each lamp 14A and 14B, respectively. In this way, the voltage across the lamp gradually increases as the P.T.C. thermistor self heats until finally the striking voltage with hot filaments is reached and the lamp strikes.

The circuit shown in FIG. 4 is a passive rectifier circuit and provides power factor improvement. It is applicable to low power ballasts such as compact fluorescent lamps. Preferably it is coupled to a 230 volts ac mains supply but suffers from the disadvantage of low dc rectified output voltage on the dc bus D and results in a crest factor of about two.

A crest factor standard not exceeding 1.7 is recommended by fluorescent lamp manufacturers to realize the maximum life projections of 20,000 hours for such lamps.

Lamp crest factor is defined as follows:

$$\text{Crest Factor} = \frac{\text{Peak Current}}{\text{RMS Current}}$$

Figure 5A:
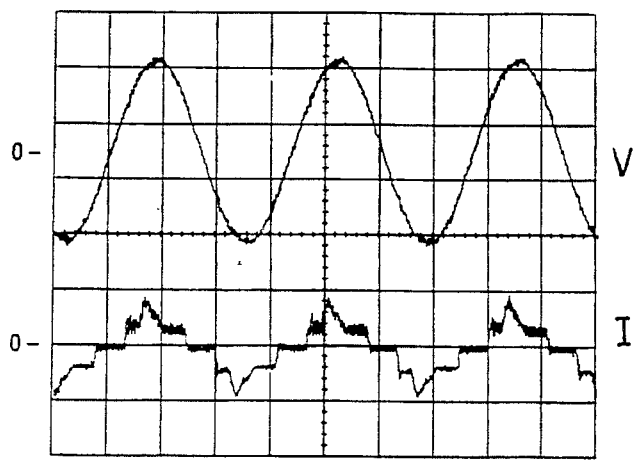
FIGS. 5A and 5B show waveforms of the circuit of FIG. 4.
Figure 5B:
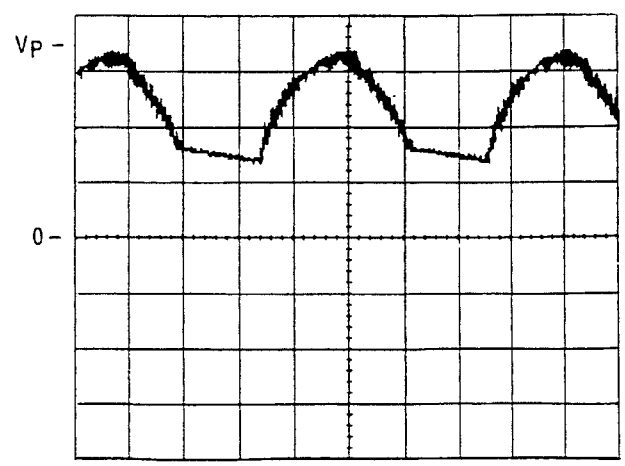

If the ballast of FIG. 4 delivers a pure sine wave of voltage and current to the lamp, the crest factor would be $\sqrt{2}$. In an electronic ballast, the dc bus voltage is derived from a mains frequency rectifier 42 and is filtered by means of an electrolytic capacitor. The 2× line frequency ripple voltage on the dc bus due to rectification gives rise to additional ripple currents in the lamp. Even if the lamp current is sinusoidal (crest factor 1.414) the mains related ripple adds to the peak current value and causes the crest factor to increase. FIG. 5A shows the ac voltage V and current I for the circuit of FIG. 4. FIG. 5B shows the dc bus voltage D. Referring to the waveform of FIG. 5B, the ripple voltage amplitude is approximately Vp/2 which results in a crest factor of approximately two.

What is needed, therefore, is power factor correction, using active control to minimize current ripple and stabilize the dc bus voltage. According to the invention, by providing power factor correction in an active switching circuit using an MGD, the twin aims of high power factor with stabilized dc bus voltage can be achieved.

Accordingly to the invention, a boost regulator circuit is provided in an electronic ballast circuit employing an MGD to achieve power factor correction and low ripple. Boost regulator correction circuits have become popular for offline power supplies and several semiconductor manufacturers supply such control ICs.

For electronic ballasts, however, the sophistication of these control chips may not be necessary, and it is preferable to provide power factors exceeding 0.95 using a simpler boost arrangement operating at a fixed 50% duty cycle. Using an MGD driver, e.g., the IR2155 driver, it is also possible to provide dimming control by changing the duty cycle and hence the boost ratio.

Figure 6:
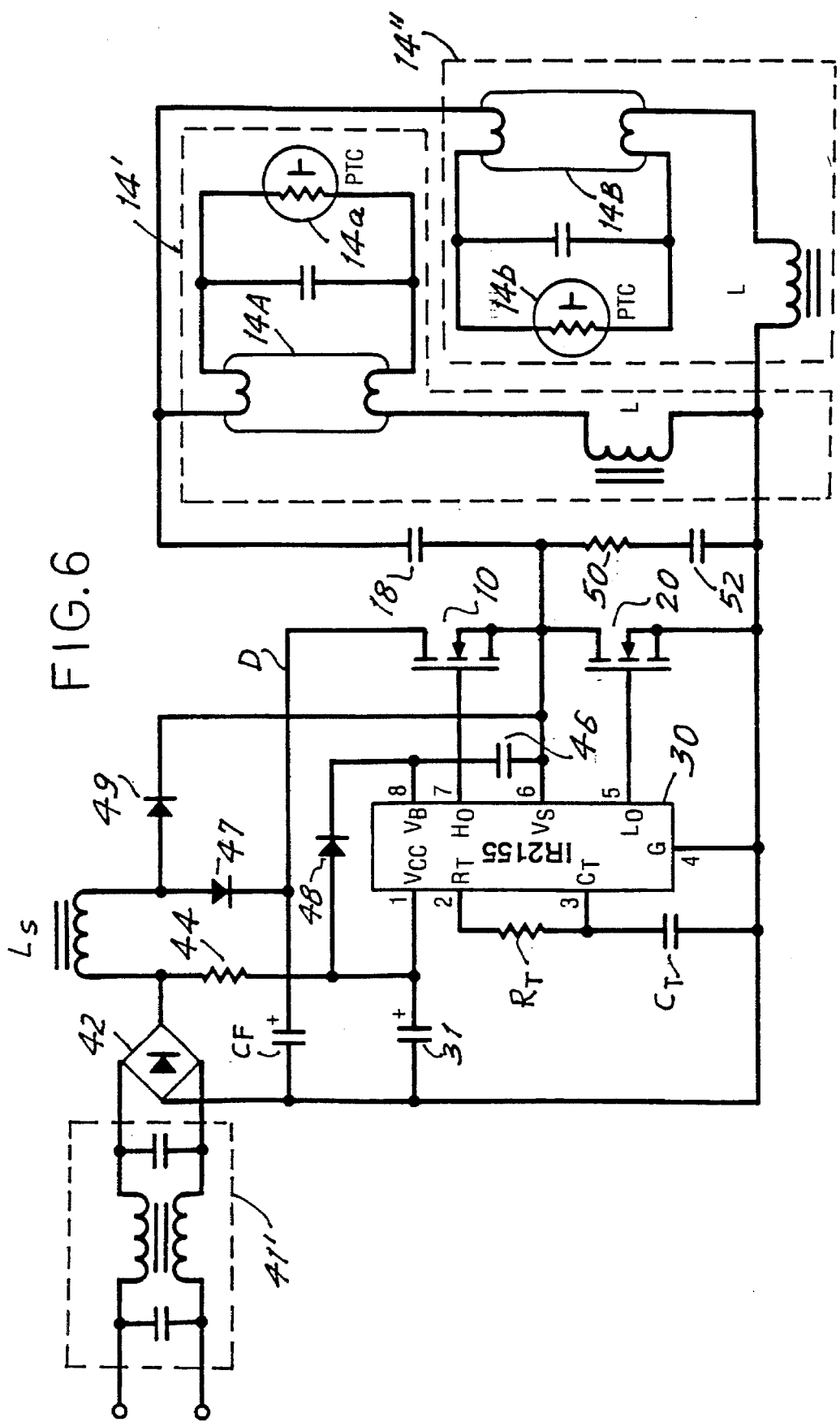
FIG. 6 shows an electronic ballast circuit using an MGD according to the invention and having a high power factor but employing power factor correction in accordance with the prior art.
Figure 7:
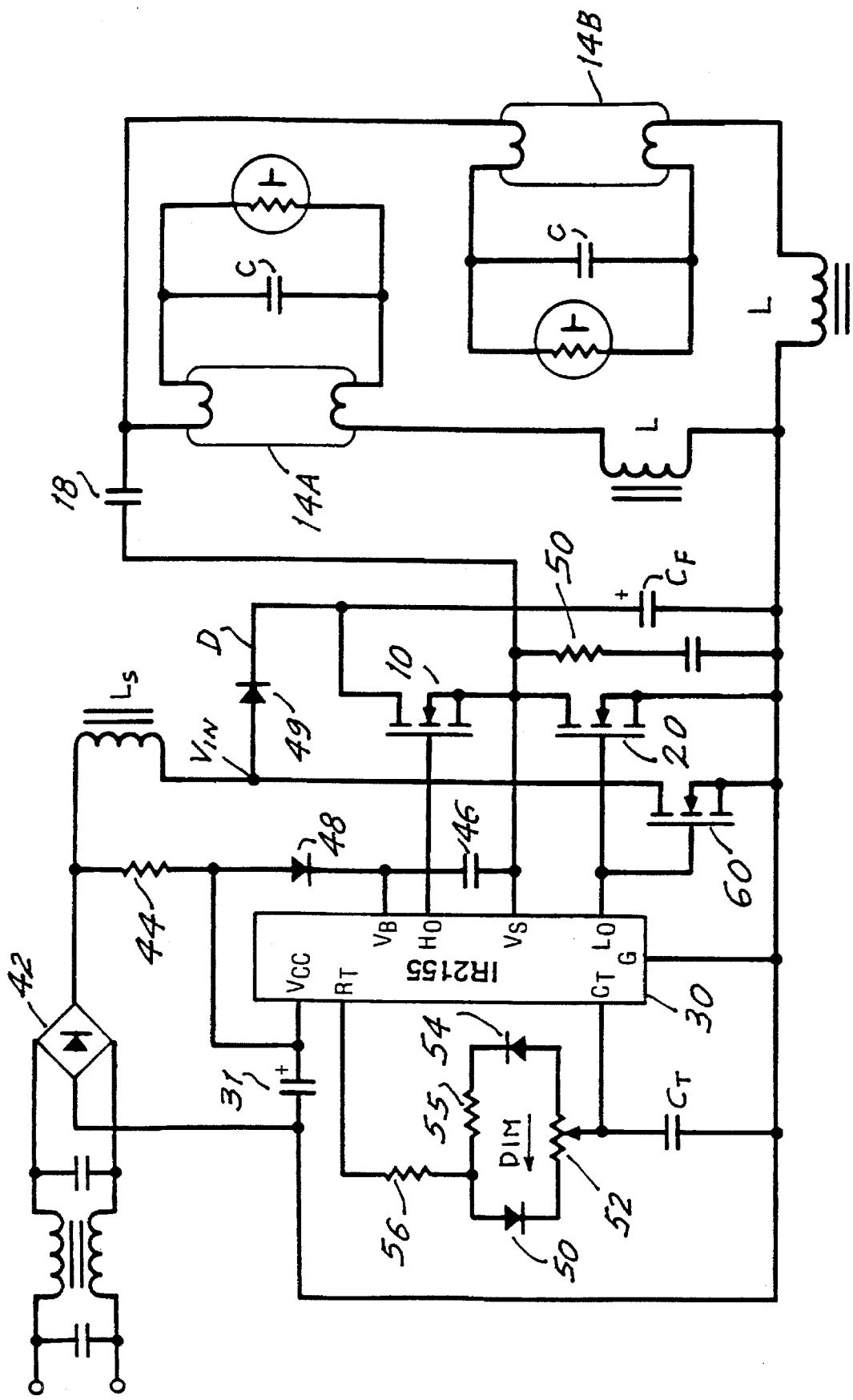
FIG. 7 shows another electronic ballast circuit using an MGD according to the invention with power factor correction and having dimming control.

FIGS. 6 and 7 illustrate two ways to achieve high power factor. FIG. 6 shows an arrangement for achieving high power factor in accordance with U.S. Pat. No. 5,001,400 but using much less expensive MGD chips instead of the current transformers used in the prior art circuits of the '400 patent.

The circuit of FIG. 6 is similar to the circuit of FIG. 3, and like reference numerals have been used for similar components, as in the other figures. A significant difference is that the circuit of FIG. 6 uses the lower electronic switch 20 to achieve power factor correction. This is achieved by providing an energy storage inductor $L_S$. Inductor $L_S$ is coupled to the output of rectifier 42 fed from the ac main through ac filter 41'. Rectifier 42 feeds two diodes 47 and 49. Diode 47 is coupled to the dc bus D and diode 49 is coupled to the common output of switches 10 and 20. An energy storage filter capacitor $C_F$ is coupled to the dc bus D. The electronic switch 20 switches the energy storing inductor $L_S$ at the switching frequency determined by timing components $R_T$ and $C_T$ coupled to the gate driver 30. As a result, power is drawn from the mains with a high power factor in excess of 0.95 lagging. The transistor 20 thus functions as a primitive form of boost regulator.

FIG. 7 shows an alternative embodiment in which a separate regulator boost transistor 60 is used to switch the inductor $L_S$. In this case, the diode 47 of FIG. 6 is unnecessary. An energy storage filter capacitor CF is provided across the dc bus, as in FIG. 6.

The boost regulator transistor 60 functions as a form of boost regulator switch, charging the energy storing inductor $L_S$ to ground at the frequency of operation of the driver 30, thereby providing stored inductive energy which discharges through the boost diode 49 into the d.c. bus D to maintain essentially constant d.c. voltage. The diode 49 also isolates the voltage on the bus D when transistor 60 conducts.

As discussed, the IR2155 MGD device 30 has a "front end" oscillator circuit like that of the 555 timer IC and is amenable to the same type of timing circuitry to control the duty cycle of the output waveforms. The timing circuitry can be used to control dimming, as shown in FIG. 7, by controlling the duty cycle.

Dimming control to 50% of power input is achieved by the control shown in FIG. 7. By decreasing the duty cycle of the driver circuit 30, and thus the on times of switches 60 and 20, the fluorescent lamp can be dimmed. When $R_T$ (pin 2) switches high, the charging path for $C_T$ (pin 3) is through the forward biased diode 50, resistor 56 and the left side of the duty cycle control potentiometer 52. When $C_T$ charges to two-thirds $V_{CC}$, $R_T$ switches low and $C_T$ discharges through the right side of the control potentiometer 52, diode 54 and resistors 55 and 56. The cycle repeats when a voltage of one-third $V_{CC}$ is reached at $C_T$. Although the charge and discharge times of $C_T$ can be varied, the sum of them and hence the frequency, remains constant. This allows sufficient lamp striking voltage even under dimmed conditions.

In actual operation, the "on" time of the boost regulator MOSFET 60 is reduced as $R_T(CHG)$ becomes smaller than $R_T(DISCH)$. If the "on" time of the boost MOSFET 60 is reduced, the boost voltage ratio is also reduced proportionately:

$$\text{Boost voltage ratio} = V_{IN} \times \frac{1}{1-D} \qquad (6)$$

$$\text{e.g., at 50\% duty cycle } V_{IN} \times \frac{1}{0.5} = 2V_{IN}$$

where $V_{IN}$=instantaneous input voltage (see FIG. 7) and P is the "ON" time ratio of the boost MOSFET.

Figure 8:
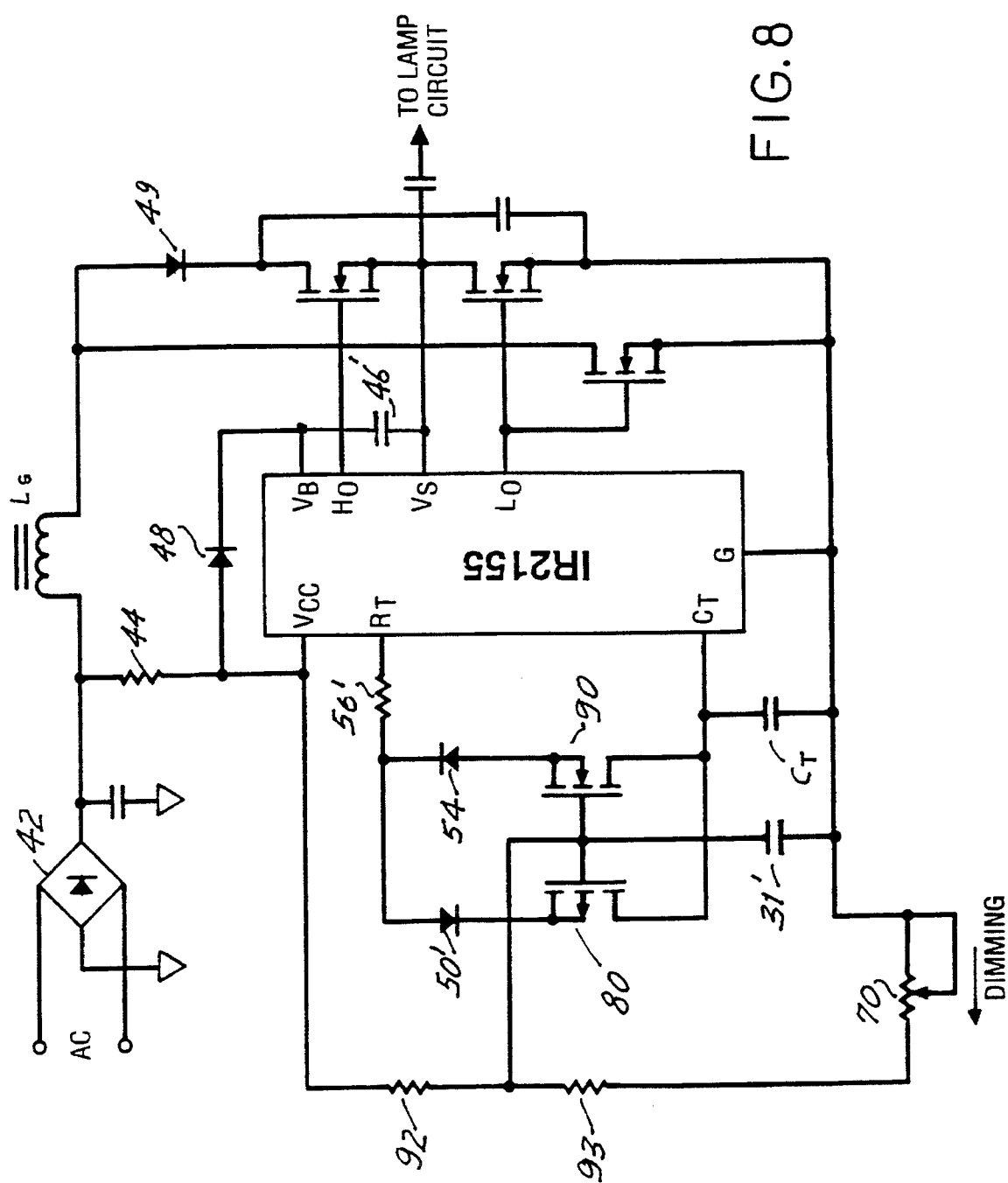
FIG. 8 shows a further electronic ballast circuit with dimming control.

A variation of the circuit of FIG. 7 is shown in FIG. 8 which allows dimming to be controlled remotely by a variable resistor 70. In the circuit of FIG. 8, two MOSFET switches 80 and 90 are employed to control dimming. Capacitor $C_T$ charges through diode 50', switch 80 and resistor 56'. Capacitor $C_T$ discharges through switch 90, diode 54' and resistor 56' when $R_T$ goes low. By control of the voltage at the gates of switches 80 and 90 via the voltage divider comprising resistors 92, 93 and variable resistor 70, the rate of charge and discharge of capacitor $C_T$ can be controlled thereby to control operating duty cycle and thereby lamp dimming. By controlling the gate voltage at switches 80 and 90, the drain current is varied, thus controlling the charge and discharge times for capacitor $C_T$. This, of course controls the duty cycle, and accordingly, the brightness of the lamps. The lower the duty cycle, the lower the lamp brightness. Capacitor 31' serves as a filter to steady the gate voltage at the switches 80 and 90.

The circuits of FIGS. 6, 7 and 8, although operating at high power factor, all suffer from a basic flaw, namely that if the lamps are removed or broken (open circuit), the open circuit dc bus voltage rises until the power MOSFETs 10 and 20 avalanche and fail or the filter capacitor $C_F$ overheats and fails due to overvoltage. This occurs because the discharge current of the inductor LS falls to zero and the stored energy which is still being provided by the switching of MOSFET 60 causes the voltage of dc bus D to rise to an uncontrolled high voltage.

Figure 9:
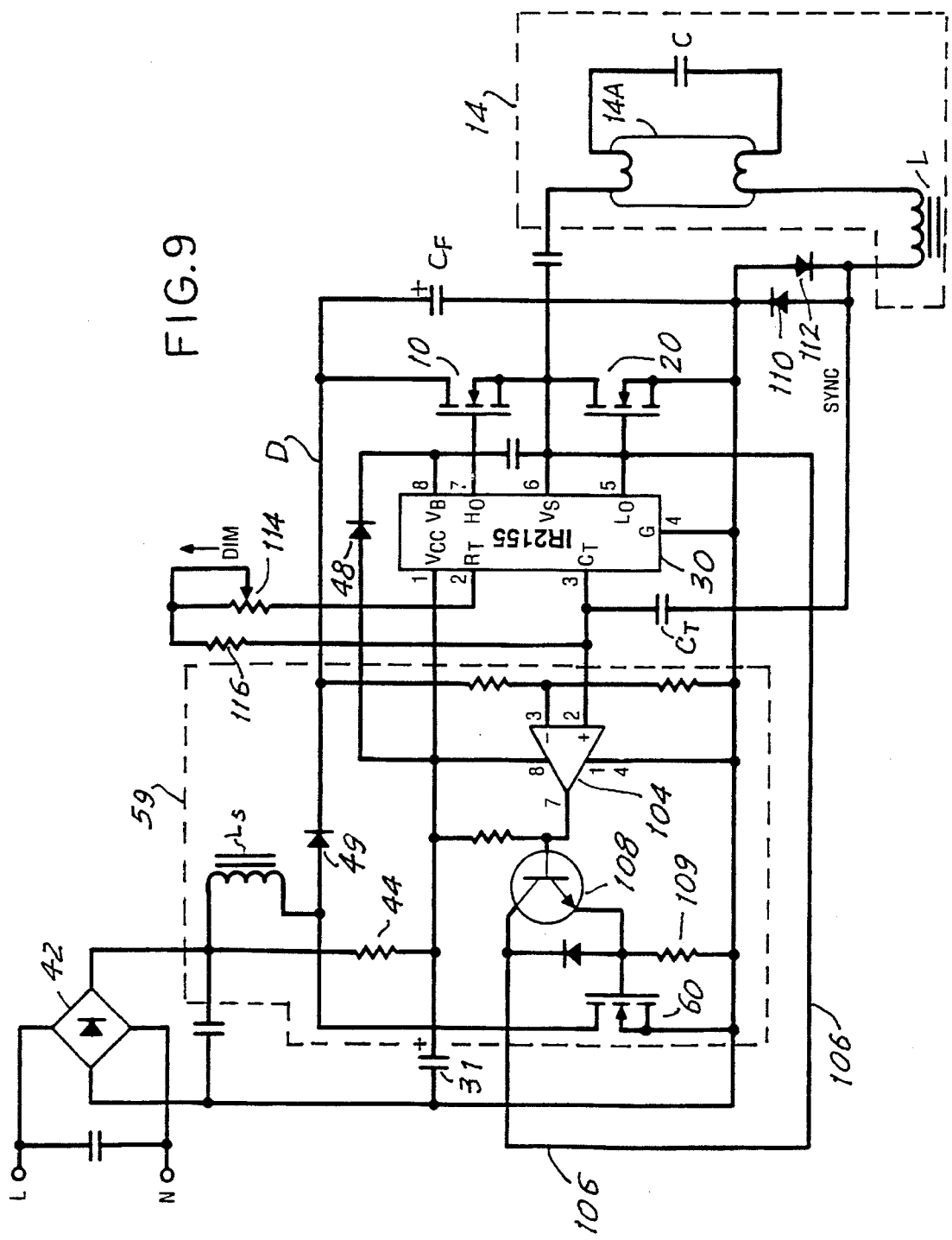
FIG. 9 shows an electronic ballast circuit with power factor correction according to the present invention.

With reference now to FIG. 9, this figure shows an electronic ballast utilizing an oscillating driver chip having improved power factor correction. This circuit eliminates the disadvantages of the circuits of FIGS. 6, 7 and 8 wherein the dc bus voltage rises when the lamps are removed or broken (open circuit condition).

With reference to FIG. 9, to prevent the bus voltage from rising in this circumstance, the duty cycle of the boost transistor 60 is controlled independently of the driver 30 50% duty cycle by monitoring the dc bus D voltage level. This is performed by a power factor control circuit 59 so that the duty cycle of the transistor 60 is reduced and the dc bus D is regulated to a constant level.

In operation, the duty cycle of the boost regulator transistor 60' is determined by comparing a fraction of the dc bus D voltage from a voltage divider comprising resistors 100 and 102 in a comparator 104 with a reference input comprising a triangle wave appearing on the timing capacitor $C_T$. The switching levels of the MGD 30 timing circuit occur at one-third $V_{CC}$ and two-thirds $V_{CC}$. Since $V_{CC}$ is regulated by a voltage regulator internal to device 30, the amplitude of the waveform on capacitor $C_T$ is also regulated.

Comparator 104, which may be a type LM311, produces a positive output whenever the instantaneous voltage on $C_T$ exceeds the fraction of the dc bus D voltage determined by the voltage divider. The output of comparator 104 is "OR"ed with the 50% $L_0$ waveform on line 106 and impedance matched to drive the boost transistor 60' by an emitter follower stage 108. In this way, the 50% duty cycle of driver 30 is modified by the comparator 104. In particular, the 50% duty cycle is reduced whenever the fraction of the bus voltage at the inverting input of comparator 104 rises above the level determined by the instantaneous voltage at $C_T$. The $L_0$ waveform, present on the collector of emitter follower 108, sets the "basic" duty cycle of transistor 60'. The emitter follower 108 "ORs" the $L_0$ waveform with the comparator 104 output such that if either $L_0$ or the comparator 104 output is low, the emitter follower output across resistor 109 will follow and also go low. This drives transistor 60' off, reducing the duty cycle. Transistor 60' can only be on when both waveform $L_0$ is high and the comparator 104 output is high. The dc bus D regulation resulting from this technique is, illustratively, 210–225 Vdc with an input ac range of 90 Vac to 130 Vac and dimming from 50% to 100% (225 Vdc maximum with bulb removed). Dimming is controlled by variable resistor 114 and performed by raising the operating frequency to approximately double for a 50% reduction in power output. The higher the oscillation frequency, the dimmer the lamp. The dimming achieved by the circuit of FIG. 9, which is frequency dependent, should be contrasted to that of FIGS. 7 and 8, in which dimming is performed by duty cycle control instead of frequency control.

Reliable striking of the lamp 14A is assured at any dimmer setting because the circuit is synchronized by a synchronization circuit to the natural resonance of the lamp circuit 14. Two back to back oppositely poled diodes 110 and 112 form the synchronization circuit and comprise a zero current crossing detector for the lamp current. Capacitor $C_T$ is connected between the $C_T$ input connection of device 30 and the synchronization voltage.

After the lamp strikes, the synchronization circuit is no longer able to control the frequency which then reverts to whatever is selected by $C_T$ and $R_T$, the latter being determined by variable resistor 114 connected to $C_T$ through resistor 116.

The circuit of FIG. 9 does not suffer from the flaw of the circuits of FIGS. 6–8, i.e., in FIGS. 6–8 the boost regulator provides no dc bus regulation in the event of an open load circuit. The circuit of FIG. 9, in contrast, provides voltage regulation even in the event of an open load circuit because when a high dc bus level is sensed by comparator 104 (as would occur in the event of an open load circuit), the output of comparator 104 goes low, causing the emitter follower stage to follow and turn off boost transistor 60'. The switching off of the inductor $L_S$ current through the transistor 60' causes a reduction in stored energy in the inductor $L_S$, forcing the voltage on the dc bus to remain within its preset range. Charge will then drain off capacitor $C_F$ until diode 49 again forward biases and energy is transferred through inductor $L_S$.

The circuit of FIG. 9 has a power factor greater than 0.95, low ripple on the dc bus and the dc bus level cannot rise above the range preset by the regulator circuit 59 in the event the load becomes an open circuit.

Figure 10:
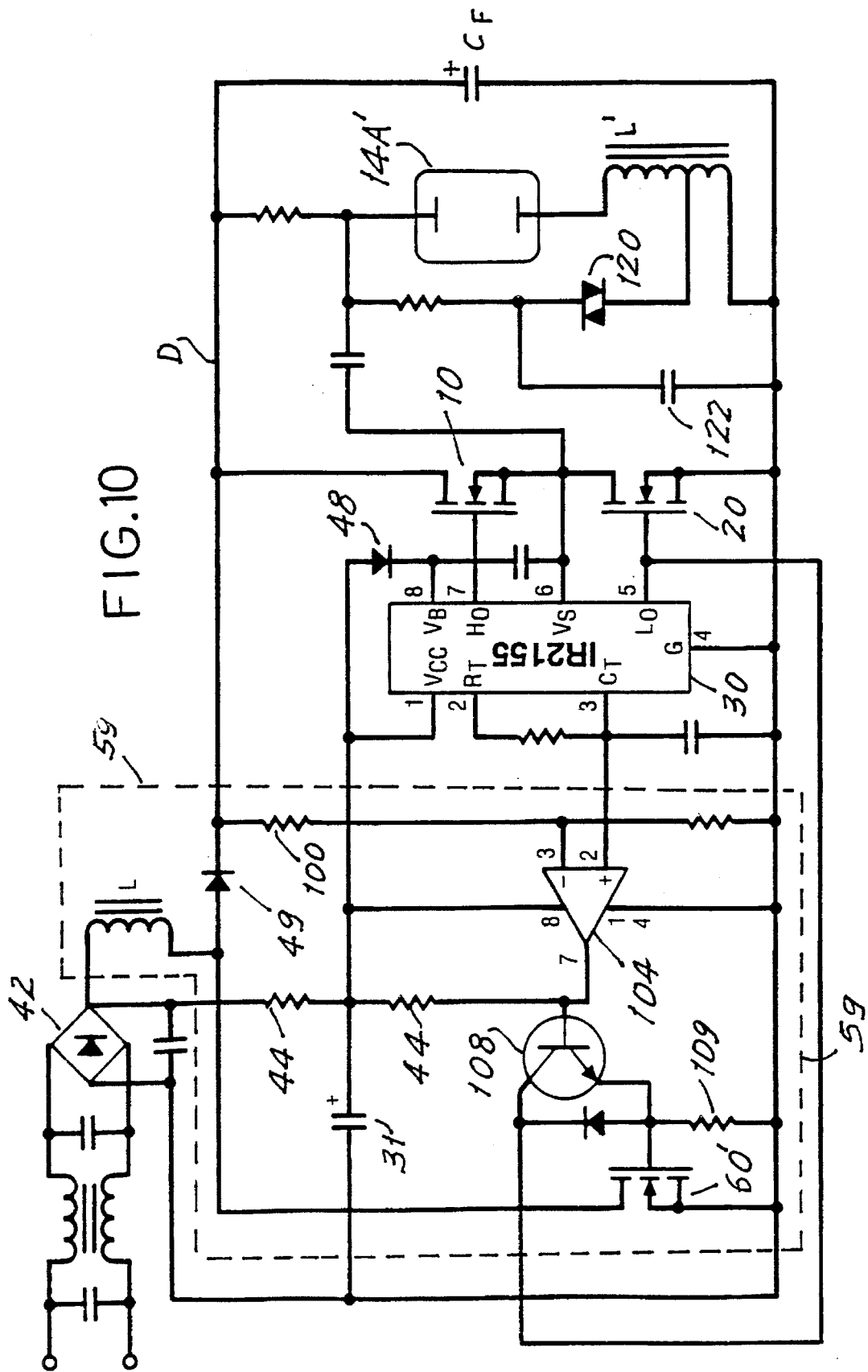
FIG. 10 shows the circuit of FIG. 9 applied to the control of a 70 watt high pressure sodium (HPS) lamp.

In addition to fluorescent ballast applications, the invention can be employed as a High Intensity Discharge (HID) ballast, for example, for outdoor lighting. A high pressure sodium (HPS) lamp ballast is illustrated in FIG. 10. The ballast can be used with, e.g., a 70 watt HPS lamp.

HPS ballasts have some unique features not found in fluorescent ballasts.

For example:

They must supply sufficient energy at 3–4 kV to start the lamp.

They must accommodate large variations in lamp voltage.

They must not cause arc instability in the lamp.

They must be matched to lamp characteristics to maximize lamp life.

Additionally, as in fluorescent ballasts, they should not be damaged when operating into an open circuit.

The circuit of FIG. 10 provides an input power factor >0.9 and has dc bus control limiting the dc bus voltage whether or not the lamp 14A' is energized. Transformer L' performs two functions, (1) current limiting for the negative resistance characteristics of the HPS lamp 14A', and (2) a pulse voltage step-up function to strike the HPS lamp 14A'. Transformer L' has a primary of two turns and a secondary of 63 turns to give a step-up ratio of approximately 30.

The 3 kV pulse voltage for striking lamp 14A' is derived from a DIAC 120 which discharges a capacitor 122 into the 2 turn winding of L'. The 30:1 step up ratio of L' supplies the starting pulse to the lamp 14A'. After the lamp strikes, there is insufficient charged voltage on the capacitor 122 in the 2 turn winding circuit of transformer L' to avalanche the DIAC 120 and no further start pulses are supplied. The hot re-strike time of this ballast is approximately 75 seconds. The same power factor correction circuit 59 as in FIG. 9 is used in this circuit and will not be further described. The structure and operation of the overall circuit is otherwise the same as the circuit of FIG. 9.

Figure 11:
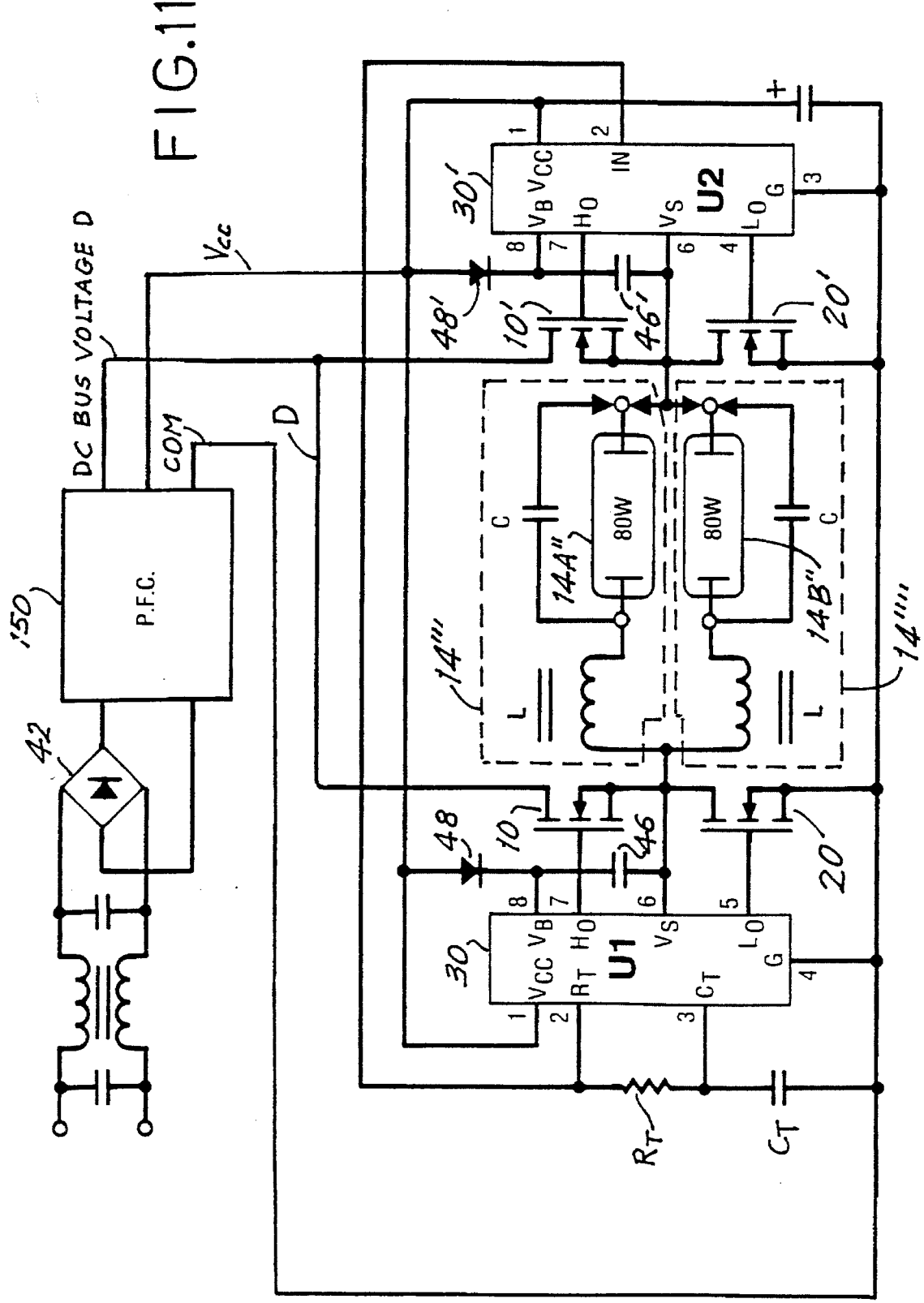
FIG. 11 shows a full bridge 160 watt electronic fluorescent lamp ballast having another form of power factor correction circuit.

Some applications require higher lamp voltages which may be too high for the simple ½ bridge topology shown in FIGS. 2–10. By using four power MOSFETs 10, 20, 10' and 20' in a full bridge circuit, as shown in FIG. 11, the output voltage may be doubled without increasing the MOSFET current. A full bridge circuit automatically doubles output power and this topology can be implemented with a master oscillator driver 30 (e.g., IR2155) driving a slave circuit 30' (e.g., IR2111).

The ballast of FIG. 11 can be used to drive two 80 watt fluorescent lamps 14A' and 14B' such as F96-T12 type. These lamps are operated at the same current as their 48-inch counterparts but require twice the voltage both for striking and normal operation. These slim line lamps have single pin contacts and are designed to be instantly started from suitable ballasts. Since the lamps start with cold electrodes, the ballast must provide in excess of 800 V RMS for reliable starting of any lamp at low ambient temperatures.

The circuit of FIG. 11 has a full bridge inverter with each leg driven from a respective driver 30 and 30'. Driver 30 is a self oscillating MGD and driver 30' is a slave MGD, e.g., an IR2111 driver, available from International Rectifier Corp. The operation of the driver 30 is the same as previously described with respect to the ballast of FIG. 3. The full bridge circuit essentially doubles the available ac output voltage compared with the ½ bridge design.

The slave MGD 30 is driven from pin 2 of driver 30 and provides an inversion of its input signal at pin 2 to the $L_0$ drive waveform at pin 4. Driver 30 does not have this inversion feature so its $L_0$ waveform is in phase with pin 2. When driven in this fashion, it is apparent that transistor 10 and transistor 20' conduct together and on the other half cycle transistor 20 and 10' conduct together. The resultant output square wave has the same RMS value as the dc bus D voltage (400 VDC). The lamp circuits 14''' and 14'''' are resonant at the self-oscillating frequency of driver 30 determined from the relationship:

$$f_{osc} = \frac{1}{1.4(R_T + 150\Omega)C_T}$$

The low Q lamp circuits 14''' and 14'''' have a broad resonance curve so that tolerance buildups of the timing components $R_T$ and $C_T$ do not seriously compromise the available striking voltage for each lamp. Even with a Q of only 2, the RMS lamp striking voltage exceeds 800 V which is more than sufficient to strike the F96T12 lamps.

Also shown in FIG. 11 is a power factor correction circuit 150 following the ac input rectifier 42. Circuit 150 uses a boost topology to achieve in phase ac sinusoidal current waveforms with low harmonic content. This is becoming more universally required particularly at higher power levels. An example of such a power factor correction circuit is the MC34262 available from Motorola. Equivalents are available from other manufacturers.

Although the present invention has been described in relation to particular embodiments thereof, many other variations and modifications and other uses will become apparent to those skilled in the art. For example, the self oscillating driver circuit 30 can be made of discrete components achieving each or substantially all the functions of the integrated driver device shown. Further, other equivalent devices can be used in place of driver 30. Additionally, the boost regulator circuit 59 could be integrated in the device 30. Therefore, the present invention should be limited not by the specific disclosure herein, but only by the appended claims.

What is claimed is:

1. A circuit for driving a gas discharge illumination device comprising:

a pair of electronic switches arranged in a half bridge configuration;

a self oscillating driver circuit having two outputs for driving respective ones of said electronic switches, the electronic switches being coupled across a dc bus voltage and having a switched output coupled to the illumination device; and a voltage regulator circuit coupled across said dc bus voltage and coupled to said self oscillating driver circuit, said voltage regulator circuit maintaining said dc bus voltage within a preset range and being responsive to said dc bus voltage for preventing said dc bus voltage from exceeding said preset range if said illumination device is removed or becomes substantially an open circuit by regulating said dc bus voltage in comparison to a preset reference level.

2. The circuit of claim 1, wherein said illumination device comprises one or more lamp fixtures.

3. The circuit of claim 1, wherein the illumination device comprises a fluorescent lamp.

4. The circuit of claim 1, wherein the illumination device comprises a high intensity discharge lamp.

5. The circuit of claim 1, wherein the pair of electronic switches arranged in a half bridge configuration comprise MOSFETs.

6. The circuit of claim 1, wherein the voltage regulator circuit is coupled to the dc voltage bus by a diode.

7. The circuit of claim 6, further comprising an inductor coupled in series between a rectifier for rectifying the ac voltage on the ac main supply and said voltage regulator circuit.

8. The circuit of claim 1, wherein said pair of electronic switches are driven alternately on and off.

9. A circuit for driving a gas discharge illumination device comprising:

a pair of electronic switches arranged in a half bridge configuration;

a self oscillating driver circuit having two outputs for driving respective ones of said electronic switches, the electronic switches being coupled across a dc bus voltage and having a switched output coupled to the illumination device; and a voltage regulator circuit coupled across said dc bus voltage and coupled to said self oscillating driver circuit, said voltage regulator circuit maintaining said dc bus voltage within a preset range and preventing said dc bus voltage from exceeding said range if said illumination device is removed or becomes substantially an open circuit, the voltage regulator circuit comprising:

a comparator having a reference input and an input coupled to said dc bus voltage and for producing an output when the dc bus voltage exceeds a preset level; and an electronic switch coupled across the dc bus and having a control input coupled to the output of the comparator, said electronic switch providing a shunt across the dc bus to control the dc bus voltage.

10. The circuit of claim 9, wherein said output of said comparator controls the duty cycle of said electronic switch.

11. The circuit of claim 9, wherein the voltage regulator circuit comprises a boost regulator and further comprising an inductance in series with said electronic switch coupled between the dc bus and a rectifier supplying the dc bus.

12. The circuit of claim 9, further comprising a further electronic switch coupled between said electronic switch and said comparator output.

13. The circuit of claim 12, wherein said further electronic switch comprises an emitter follower stage.

14. The circuit of claim 12, wherein said further electronic switch is coupled to one of the outputs of said self oscillating driver circuit.

15. The circuit of claim 14, wherein said further electronic switch performs a logical operation on said output of said self oscillating driver circuit and the output of the comparator, thereby to control the duty cycle of the electronic switch in accordance with the logical operation.

16. The circuit of claim 15, wherein said logical operation causes the duty cycle of said electronic switch to be reduced in the event the dc bus voltage increases beyond the preset range.

17. The circuit of claim 9, wherein said electronic switch comprises a MOSFET.

18. The circuit of claim 17, wherein the high intensity discharge lamp comprises a high pressure sodium lamp.

19. The circuit of claim 9 wherein said self oscillating driver circuit comprises a timing circuit and said reference input of said comparator is coupled to said timing circuit.

20. A circuit for driving a gas discharge illumination device comprising:

a pair of electronic switches arranged in a half bridge configuration;

a self oscillating driver circuit having two outputs for driving respective ones of said electronic switches, the electronic switches being coupled across adc bus voltage and having a switched output coupled to the illumination device, said self oscillating driver circuit comprising a timing circuit and wherein a component of said timing circuit comprises a dimming control; and a voltage regulator circuit coupled across said dc bus voltage and coupled to said self oscillating driver circuit, said voltage regulator circuit maintaining said dc bus voltage within a preset range and preventing said dc bus voltage from exceeding said range if said illumination device is removed or becomes substantially an open circuit by regulating said dc bus voltage in comparison to a preset reference level.

21. The circuit of claim 20, wherein the dimming control comprises a variable resistor.

22. The circuit of claim 20, wherein said dimming control comprises a component of said timing circuit for varying the frequency of oscillation of said self oscillating driver circuit.

23. A circuit for driving a gas discharge illumination device comprising:
- a pair of electronic switches arranged in a half bridge configuration;
- a self oscillating driver circuit having two outputs for driving respective ones of said electronic switches, the electronic switches being coupled across a dc bus voltage and having a switched output coupled to the illumination device;
- a voltage regulator circuit coupled across said dc bus voltage and coupled to said self oscillating driver circuit, said voltage regulator circuit maintaining said dc bus voltage within a preset range and being responsive to said dc bus voltage for preventing said dc bus voltage from exceeding said preset range if said illumination device is removed or becomes substantially an open circuit; wherein the illumination device comprises a high intensity discharge lamp; and
- a trigger device coupled to said high intensity discharge lamp.

24. The circuit of claim 23, further comprising a step up transformer coupled between said trigger device and said high intensity discharge lamp for supplying a starting pulse to said high intensity discharge lamp.

25. A circuit for driving a gas discharge illumination device comprising:
- a pair of electronic switches arranged in a half bridge configuration;
- a self oscillating driver circuit having two outputs for driving respective ones of said electronic switches, the electronic switches being coupled across a dc bus voltage and having a switched output coupled to the illumination device, said self oscillating driver circuit comprising a timing circuit and wherein a component of said timing circuit comprises a dimming control;
- a voltage regulator circuit coupled across said dc bus voltage and coupled to said self oscillating driver circuit, said voltage regulator circuit maintaining said dc bus voltage within a preset range and preventing said dc bus voltage from exceeding said range if said illumination device is removed or becomes substantially an open circuit; and
- a synchronization circuit coupled to said illumination device and to said timing circuit for synchronizing the timing circuit to the illumination device current until the illumination device strikes.

26. The circuit of claim 25 wherein the synchronization circuit comprises a zero current crossing detector for detecting when the illumination device current is zero.

27. The circuit of claim 26, wherein the synchronization circuit comprises two oppositely poled diodes coupled in parallel between the illumination device and a zero volt reference level.

28. A circuit for driving a gas discharge illumination device comprising:
- a pair of electronic switches arranged in a half bridge configuration;
- a self oscillating driver circuit having two outputs for driving respective ones of said electronic switches, the electronic switches being coupled across a dc bus voltage and having a switched output coupled to the illumination device; and
- a voltage regulator circuit coupled across said dc bus voltage and coupled to said self oscillating driver circuit, said voltage regulator circuit maintaining said dc bus voltage within a preset range and preventing said dc bus voltage from exceeding said range if said illumination device is removed or becomes substantially an open circuit by regulating said dc bus voltage in comparison to a present reference level, wherein the power factor of power provided from an ac mains supply for powering the illumination device is controlled by the voltage regulator circuit so that it exceeds 0.95 lagging.

29. A circuit for driving a load from an ac main supply at a high power factor approaching unity, comprising:
- a pair of electronic switches arranged in a half bridge configuration;
- a self oscillating driver circuit having two outputs for driving respective ones of said electronic switches, the electronic switches being coupled across a dc bus voltage supplied by a rectifier from the ac main supply and the electronic switches having a switched output coupled to the load; and
- a voltage regulator circuit coupled across said dc bus voltage and coupled to said self oscillating driver circuit, said voltage regulator circuit maintaining said dc bus voltage within a preset range and being responsive to said dc bus voltage for preventing said dc bus voltage from exceeding said preset range if said load is removed or becomes an open circuit by regulating said dc bus voltage in comparison to a present reference level.

30. The circuit of claim 29, wherein said load comprises a gas discharge illumination device.

31. The circuit of claim 30, wherein the illumination device comprises one or more lamp fixtures.

32. The circuit of claim 29, wherein the load comprises a fluorescent lamp.

33. The circuit of claim 29, wherein the load comprises a high intensity discharge lamp.

34. The circuit of claim 33, wherein the high intensity discharge lamp comprises a high pressure sodium lamp.

35. The circuit of claim 34, wherein the dimming control comprises a variable resistor.

36. The circuit of claim 29 wherein the pair of electronic switches arranged in a half bridge configuration comprise MOSFETs.

37. The circuit of claim 29, wherein the voltage regulator circuit is coupled to the dc voltage bus by with a diode.

38. The circuit of claim 37, further comprising an inductance coupled in series between a rectifier for rectifying the ac voltage on the ac main supply and said voltage regulator circuit.

39. The circuit of claim 29, wherein said pair of electronic switches are driven alternately on and off.

40. A circuit for driving a load from an ac main supply at a high power factor approaching unity, comprising;
- a pair of electronic switches arranged in a half bridge configuration;
- a self oscillating driver circuit having two outputs for driving respective ones of said electronic switches, the electronic switches being coupled across a dc bus voltage supplied by a rectifier from the ac main supply and the electronic switches having a switched output coupled to the load; and a voltage regulator circuit coupled across said dc bus voltage and coupled to said self oscillating driver circuit, said voltage regulator circuit maintaining said dc bus voltage within a preset range and preventing said dc bus voltage from exceeding said range if said load is removed or becomes an open circuit, the voltage regulator circuit comprising:

a comparator having a reference input and an input coupled to said dc bus voltage and for producing an output when the dc bus voltage exceeds a preset level; and an electronic switch coupled across the dc bus and having a control input coupled to the output of the comparator, said electronic switch providing a shunt across the dc bus to control the dc bus voltage.

41. The circuit of claim 40, wherein said output of said comparator controls the duty cycle of said electronic switch.

42. The circuit of claim 40, wherein the voltage regulator circuit comprises a boost regulator and further comprising an inductance in series with said electronic switch coupled between the dc bus and a rectifier supplying the dc bus.

43. The circuit of claim 40, further comprising a further electronic switch coupled between said electronic switch and said comparator output.

44. The circuit of claim 43, wherein said further electronic switch comprises an emitter follower stage.

45. The circuit of claim 43, wherein said further electronic switch is coupled to one of the outputs of said self oscillating driver circuit.

46. The circuit of claim 45, wherein said further electronic switch performs a logical operation on said output of said self oscillating driver circuit and the output of the comparator, thereby to control the duty cycle of the electronic switch in accordance with the logical operation.

47. The circuit of claim 46, wherein said logical operation causes the duty cycle of said electronic switch to be reduced in the event the dc bus voltage increases beyond the preset range.

48. The circuit of claim 40, wherein said electronic switch comprises a MOSFET.

49. The circuit of claim 40 wherein said self oscillating driver circuit comprises a timing circuit and said reference input of said comparator is coupled to said timing circuit.

50. A circuit for driving a load from an ac main supply at a high power factor approaching unity, comprising:

a pair of electronic switches arranged in a half bridge configuration;

a self oscillating driver circuit having two outputs for driving respective ones of said electronic switches, the electronic switches being coupled across a dc bus voltage supplied by a rectifier from the ac main supply and the electronic switches having a switched output coupled to the load, said self oscillating driver circuit comprising a timing circuit and wherein a component of said timing circuit comprises a dimming control; and a voltage regulator circuit coupled across said dc bus voltage and coupled to said self oscillating driver circuit, said voltage regulator circuit maintaining said dc bus voltage within a preset range and preventing said dc bus voltage from exceeding said range if said load is removed or becomes an open circuit by regulating said dc bus voltage in comparison to a present reference level.

51. The circuit of claim 50, wherein said dimming control comprises a component of said timing circuit for varying the frequency of oscillation of said self oscillating driver circuit.

52. A circuit for driving a load from an ac main supply at a high power factor approaching unity, comprising:

a pair of electronic switches arranged in a half bridge configuration;

a self oscillating driver circuit having two outputs for driving respective ones of said electronic switches, the electronic switches being coupled across a dc bus voltage supplied by a rectifier from the ac main supply and the electronic switches having a switched output coupled to the load;

a voltage regulator circuit coupled across said dc bus voltage and coupled to said self oscillating driver circuit, said voltage regulator circuit maintaining said dc bus voltage within a preset range and being responsive to said dc bus voltage for preventing said dc bus voltage from exceeding said preset range if said load is removed or becomes an open circuit; wherein the load comprises a high intensity discharge lamp; and a trigger device coupled to said high intensity discharge lamp.

53. The circuit of claim 52, further comprising a step up transformer coupled between said trigger device and said high intensity discharge lamp for supplying a starting pulse to said high intensity discharge lamp.

54. A circuit for driving a load from an ac main supply at a high power factor approaching unity, comprising:

a pair of electronic switches arranged in a half bridge configuration;

a self oscillating driver circuit having two outputs for driving respective ones of said electronic switches, the electronic switches being coupled across a dc bus voltage supplied by a rectifier from the ac main supply and the electronic switches having a switched output coupled to the load, said self oscillating driver circuit comprising a timing circuit and wherein a component of said timing circuit comprises a dimming control; and a voltage regulator circuit coupled across said dc bus voltage and coupled to said self oscillating driver circuit, said voltage regulator circuit maintaining said dc bus voltage within a preset range and preventing said dc bus voltage from exceeding said range if said load is removed or becomes an open circuit; wherein said load comprises a gas discharge illumination device; and a synchronization circuit coupled to said illumination device and to said timing circuit for synchronizing the timing circuit to the illumination device current until the illumination device strikes.

55. The circuit of claim 54 wherein the synchronization circuit comprises a zero current crossing detector for detecting when the illumination device current is zero.

56. The circuit of claim 55, wherein the synchronization circuit comprises two oppositely poled diodes coupled in parallel between the illumination device and a zero volt reference level.

57. A circuit for driving a load from an ac main supply at a high power factor approaching unity, comprising:

a pair of electronic switches arranged in a half bridge configuration;

a self oscillating driver circuit having two outputs for driving respective ones of said electronic switches, the electronic switches being coupled across a dc bus voltage supplied by a rectifier from the ac main supply and the electronic switches having a switched output coupled to the load; and a voltage regulator circuit coupled across said dc bus voltage and coupled to said self oscillating driver circuit, said voltage regulator circuit maintaining said dc bus voltage within a preset range and preventing said dc bus voltage from exceeding said range if said load is removed or becomes an open circuit by regulating said dc bus voltage in comparison to a present reference level, wherein the power factor of power provided from the ac mains supply for powering the load is controlled by the voltage regulator circuit so that it exceeds 0.95 lagging.

58. A method for driving a load from an ac main supply at a high power factor approaching unity, comprising:

arranging a pair of electronic switches in a half bridge configuration;

driving respective ones of said electronic switches with a self oscillating driver circuit having two outputs, the electronic switches being coupled across a dc bus voltage supplied by a rectifier from the ac main supply and the electronic switches having a switched output coupled to the load;

providing a voltage regulator circuit coupled across said dc bus voltage and coupled to said self oscillating driver circuit; and maintaining said dc bus voltage within a preset range and preventing, in response to said dc bus voltage, said dc bus voltage from exceeding said preset range with said voltage regulator circuit if said load is removed or becomes an open circuit by regulating said dc bus voltage in comparison to a present reference level.

59. The method of claim 58, wherein said load comprises a gas discharge illumination device.

60. The method of claim 59, wherein the illumination device comprises one or more lamp fixtures.

61. A method for driving a load from an ac main supply at a high power factor approaching unity, comprising:

arranging a pair of electronic switches in a half bridge configuration;

driving respective ones of said electronic switches with a self oscillating driver circuit having two outputs, the electronic switches being coupled across a dc bus voltage supplied by a rectifier from the ac main supply and the electronic switches having a switched output coupled to the load;

providing a voltage regulator circuit coupled across said dc bus voltage and coupled to said self oscillating driver circuit; and maintaining said dc bus voltage within a preset range and preventing said dc bus voltage from exceeding said range with said voltage regulator circuit if said load is removed or becomes an open circuit;

wherein the step of providing a voltage regulator circuit comprises:

providing a comparator having a reference input and an input coupled to said dc bus voltage and producing an output when the dc bus voltage exceeds a preset level determined by said reference input; and arranging an electronic switch across the dc bus and having a control input coupled to the output of the comparator, said electronic switch providing a shunt across the dc bus to control the dc bus voltage.

62. The method of claim 61, wherein said step of producing an output with said comparator controls the duty cycle of said electronic switch.

63. The method of claim 61, wherein the step of providing a voltage regulator circuit comprises providing a boost regulator and an inductance in series with said electronic switch coupled between the dc bus and a rectifier supplying the dc bus.

64. The method of claim 61, further comprising providing a further electronic switch coupled between said electronic switch and said comparator output.

65. The method of claim 64, further comprising coupling an output of said self oscillating driver circuit to said further electronic switch.

66. The method of claim 65, further comprising performing with said further electronic switch a logical operation on said output of said self oscillating driver circuit and the output of the comparator, thereby to control the duty cycle of the electronic switch.

67. The method of claim 66, wherein the logical operation causes the duty cycle of said electronic switch to be reduced in the event the dc bus voltage increases beyond the present range.

68. The method of claim 61, wherein said self oscillating driver circuit comprises a timing circuit and further comprising coupling the reference input of said comparator to said timing circuit.

69. A method for driving a load from an ac main supply at a high power factor approaching unity, comprising:

arranging a pair of electronic switches in a half bridge configuration;

driving respective ones of said electronic switches with a self oscillating driver circuit having two outputs, the electronic switches being coupled across a dc bus voltage supplied by a rectifier from the ac main supply and the electronic switches having a switched output coupled to the load, wherein said self oscillating driver circuit comprises a timing circuit and further comprising using a component of said timing circuit as a dimming control;

providing a voltage regulator circuit coupled across said dc bus voltage and coupled to said self oscillating driver circuit; and maintaining said dc bus voltage within a preset range and preventing said dc bus voltage from exceeding said range with said voltage regulator circuit if said load is removed or becomes an open circuit by regulating said dc bus voltage in comparison to a present reference level.

70. The method of claim 69, further comprising varying the frequency of oscillation of said self oscillating driver circuit using said dimming control.

71. A method for driving a load from an ac main supply at a high power factor approaching unity, comprising:

arranging a pair of electronic switches in a half bridge configuration;

driving respective ones of said electronic switches with a self oscillating driver circuit having two outputs, the electronic switches being coupled across a dc bus voltage supplied by a rectifier from the ac main supply and the electronic switches having a switched output coupled to the load, wherein said self oscillating driver circuit comprises a timing circuit and further comprising using a component of said timing circuit as a dimming control;

providing a voltage regulator circuit coupled across said dc bus voltage and coupled to said self oscillating driver circuit;

maintaining said dc bus voltage within a preset range and preventing said dc bus voltage from exceeding said range with said voltage regulator circuit if said load is removed or becomes an open circuit; wherein said load comprises a gas discharge illumination device; and coupling a synchronization circuit to said illuminating device and to said timing circuit and synchronizing the timing circuit to the illumination device current until the illumination device strikes.

72. A method for driving a load from an ac main supply at a high power factor approaching unity, comprising:

arranging a pair of electronic switches in a half bridge configuration;

driving respective ones of said electronic switches with a self oscillating driver circuit having two outputs, the electronic switches being coupled across a dc bus voltage supplied by a rectifier from the ac main supply and the electronic switches having a switched output coupled to the load;

providing a voltage regulator circuit coupled across said dc bus voltage and coupled to said self oscillating driver circuit; and maintaining said dc bus voltage within a preset range and preventing said dc bus voltage from exceeding said range with said voltage regulator circuit if said load is removed or becomes an open circuit by regulating said dc bus voltage in comparison to a present reference level; wherein the power factor of power provided from the ac mains supply for powering the load is controlled by the voltage regulator circuit so that it exceeds 0.95 lagging.

* * * * *